United States Patent [19]
Hoefer

[11] 3,867,271
[45] Feb. 18, 1975

[54] GEL ELECTROPHORESIS APPARATUS AND METHOD

[75] Inventor: Stanton Albert Hoefer, San Francisco, Calif.

[73] Assignee: Hoefer Scientific Instruments, San Francisco, Calif.

[22] Filed: Aug. 13, 1973

[21] Appl. No.: 387,693

[52] U.S. Cl. ............................. 204/180 G, 204/299
[51] Int. Cl. .............................................. B01k 5/00
[58] Field of Search ........................ 204/180 G, 299

[56] References Cited
UNITED STATES PATENTS

| | | | |
|---|---|---|---|
| 3,384,564 | 5/1968 | Ornstein et al. | 204/180 G |
| 3,445,360 | 5/1969 | Via, Jr. | 204/180 G |
| 3,499,833 | 3/1970 | Ferris et al. | 204/180 G X |
| 3,506,554 | 4/1970 | Broome | 204/180 G |
| 3,576,727 | 4/1971 | Evatt | 204/180 G |
| 3,699,033 | 10/1972 | Zeineh | 204/180 G |

*Primary Examiner*—John H. Mack
*Assistant Examiner*—A. C. Prescott
*Attorney, Agent, or Firm*—Flehr, Hohbach, Test, Albritton & Herbert

[57] ABSTRACT

A container receives a gel tube holder adapted to hold a plurality of gel tubes. The gel tube holder and container cooperate to form an upper buffer chamber, a central cooling chamber, and a lower buffer chamber. The gel tube holder has a hollow core the interior of which is in communication with the lower buffer chamber. The gel tubes extend between the upper and lower buffer chambers with a substantial portion in the cooling chamber. A cooling medium flows through the cooling chamber for maintaining a constant temperature in the gel contained in the tubes during polymerization and electrophoresis. Means for sealing the bottom of the gel tubes during polymerization is provided. Following polymerization the means for sealing is disengaged and the buffer chambers are filled with separate quantities of buffer solution having identical hydrostatic heads. An electrical potential is applied between the buffer solution in the upper and lower chambers to provide for a potential to the gel along the tubes to perform electrophoresis.

16 Claims, 9 Drawing Figures

PATENTED FEB 18 1975

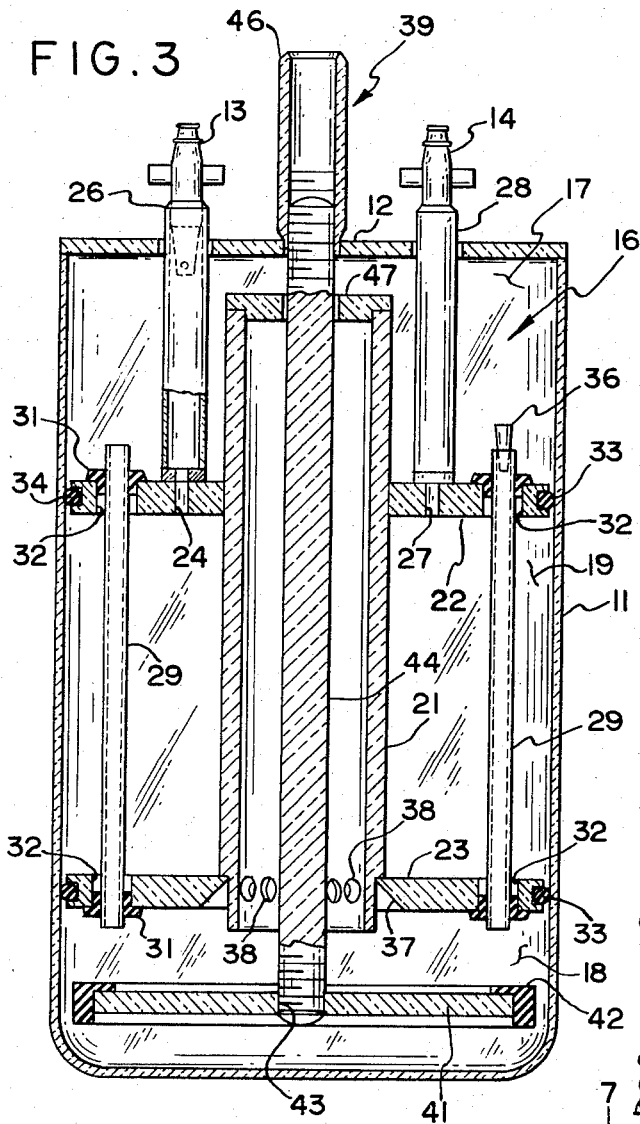
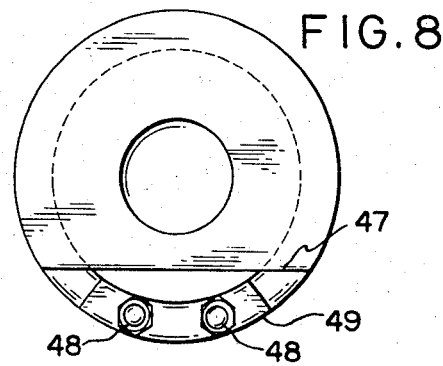
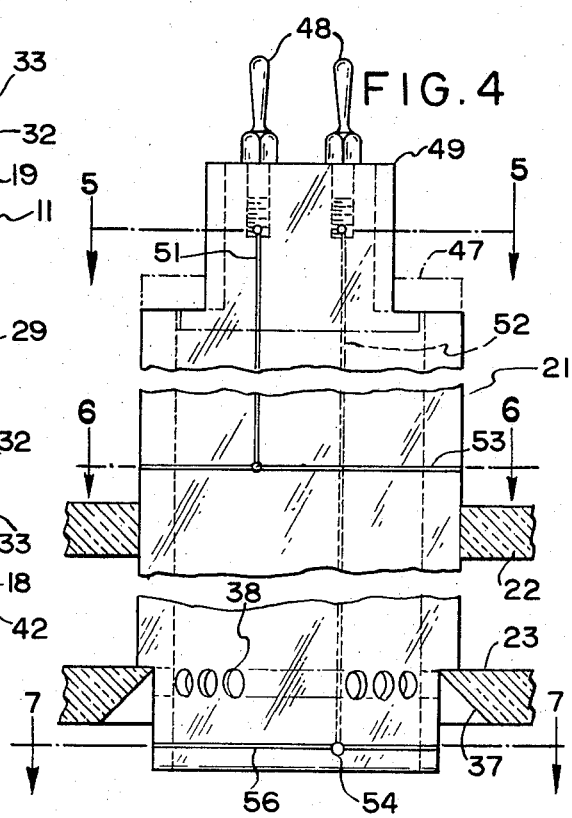
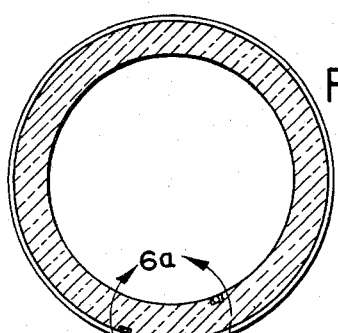
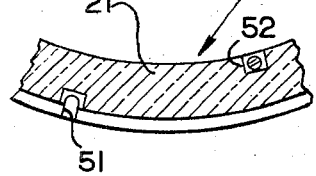
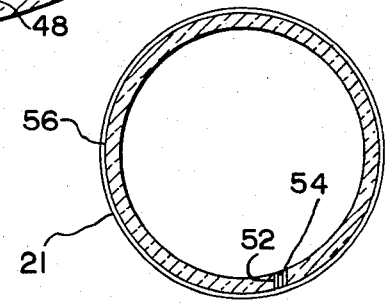

3,867,271

GEL ELECTROPHORESIS APPARATUS AND METHOD

BACKGROUND OF THE INVENTION

The present invention is directed to a gel electrophoresis unit and more particularly an electrophoresis unit within which photopolymerization may be performed and in which the risk of distortion of low concentration gels due to uneven hydrostatic pressure from the buffer solutions on the end of the gel samples is eliminated.

In general gel electrophoresis units are capable of processing one or more samples simultaneously and have the capability of maintaining a relatively constant temperature in the samples during the electrophoretic process. Tubes holding different samples generally have to be individually sealed at least at one end prior to the polymerization step. Upon completion of polymerization the seals are individually removed and the tubes containing the gel samples individually assembled in the electrophoresis unit preparatory to the electrophoresis step. In any previous vertical electrophoresis apparatus the hydrostatic head of the buffer solutions contacting the opposite ends of the polymerized sample is unequal, creating a risk of distortion in low concentration gels. Moreover, the electrodes entering the upper and lower buffer solutions are generally exposed, as are the solutions themselves, exposing the operator to the risk of electrical shock during the electrophoresis process.

There is a need therefore for a gel electrophoresis unit which provides a convenient simultaneous seal for a plurality of gel tubes prior to polymerization, within the unit, an equally convenient seal release for the gel tubes subsequent to polymerization, equalized pressures from the hydrostatic heads of the buffer solutions on the upper and lower ends of the polymerized sample, and protection for the operator from the electrical potential applied between the buffer solutions during electrophoresis.

SUMMARY AND OBJECTS OF THE INVENTION

In the present gel electrophoresis apparatus there is provided a container which passes polymerizing light having one open end and a tapered inside diameter decreasing in diameter away from the open end. A gel tube holder is formed to fit within the container, and to form seals with the tapered inside diameter to define two separate buffer chambers with a cooling chamber therebetween. The gel tube holder has a hollow vertical core in communication with the lower buffer chamber. Both buffer chambers may be filled to the same level by filling the lower chamber until the buffer solution extends through the core, providing equal hydrostatic heads on the two buffer solutions. Gel tubes for holding samples extend between the two buffer chambers through the cooling chamber. Means are provided for sealing the lower end of the gel tubes prior to and during polymerization, and for unsealing them after polymerization, thereby exposing one end of each sample to a separate buffer solution. A protective cover is placed on the open end of the container and an electrical potential is applied between the upper and lower buffer solutions for performing electrophoresis. A coolant flows through the cooling chamber to cool the sample during photopolymerization and electrophoresis.

In general it is an object of the present invention to provide a gel electrophoresis unit which provides for gel tube sealing during polymerization, gel tube unsealing, and electrophoresis all within the unit.

It is another object of the present invention to provide a gel electrophoresis unit which eliminates faulty test results due to inadequate sample temperature control and unequal hydrostatic pressures on the ends of the gel tubes during electrophoresis.

It is another object of the present invention to provide a gel electrophoresis unit with a safety cover to protect the operator from accidental electrical shock during electrophoresis.

It is another object of the present invention to provide a gel electrophoresis unit with a built-in extractor for breaking the seal between the container and the gel tube holder after electrophoresis is completed.

It is another object of the present invention to provide a gel electrophoresis unit which may conveniently handle one to eighteen different samples simultaneously.

Additional objects and features of the invention will appear from the following description in which the preferred embodiment has been set forth in detail in conjunction with the accompanying drawings.

BRIEF DESCRIPTION OF THE INVENTION

FIG. 3 is a sectional view along the line 3—3 of FIG. 2.

FIG. 4 is a breakaway view of the central core of the gel tube holder.

FIG. 5 is a sectional view along the line 5—5 of FIG. 4.

FIG. 6 is a sectional view along the line 6—6 of FIG. 4.

FIG. 6a is a detail view of a portion of FIG. 6.

FIG. 7 is a sectional view along the line 7—7 of FIG. 4.

FIG. 8 is a top view of the central core shown in FIG. 4.

DESCRIPTION OF THE PREFERRED EMBODIMENT

Figure 1:
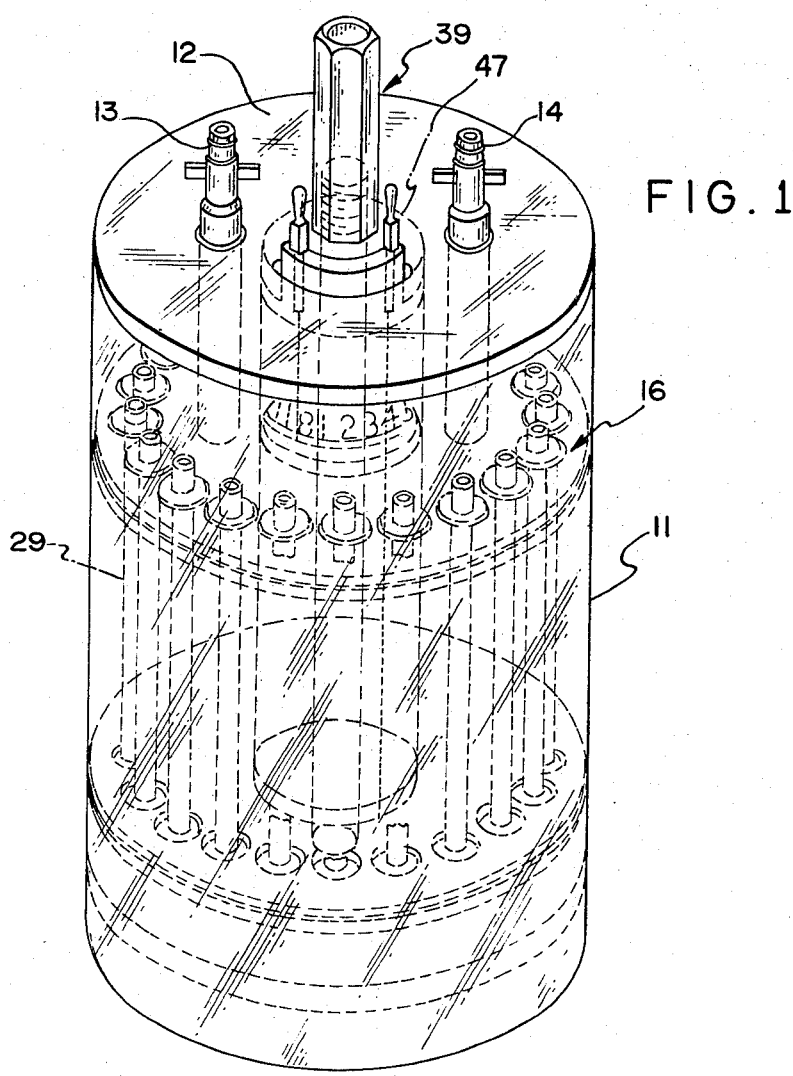
FIG. 1 is an isometric view of the gel electrophoresis unit.
Figure 2:
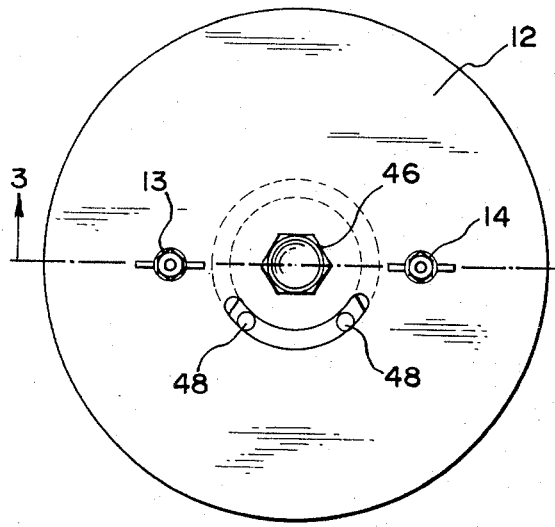
FIG. 2 is a top view of the gel electrophoresis unit.

The gel electrophoresis unit is primarily constructed using parts fabricated from nonreactive durable plastic, glass, and neoprene materials which are chemically resistant to all reagents currently in use in gel electrophoresis. Referring to FIG. 1 a chemically inert transparent container 11 is shown enclosing the apparatus. A cover 12 is formed to fit over the open end of the container 11. Inlet means 13 and outlet means 14 for the flow of coolant extend through holes in the cover 12.

Referring to FIG. 4 a gel tube holder is shown generally at 16 which when inserted in container 11 separates the container into three water tight compartments; an upper or first buffer chamber 17, a lower or second buffer chamber 18, and a cooling chamber 19 disposed therebetween. The gel tube holder 16 is constructed of a hollow central core 21 extending from the lower buffer chamber 18 toward the open end of container 11. Mounted in spaced relation on hollow central core 21 is an upper or first disc 22, and a lower or second disc 23. An inlet coolant path extends from cooling chamber 19 through a coolant hole 24 in disc 22, and through a plastic pipe 26 connected to inlet means 13. An outlet coolant path is defined by a coolant hole 27 in disc 22 and plastic pipe 28 connected to outlet means 14.

A plurality of gel tubes 29 are mounted in neoprene sealing grommets 31 disposed in spaced holes 32 in both upper and lower discs 22 and 23 respectively. Grommets 31 provide a seal at gel tubes 29 between the upper and lower buffer chambers 17 and 18 respectively and the cooling chamber 19. Upper and lower discs 22 and 23 have O-ring grooves 33 formed on their peripheries. An O-ring 34 is disposed in each O-ring groove 33 to effect a seal between the upper and lower buffer chambers 17 and 18 and the cooling chamber 19 at the periphery of upper and lower discs 22 and 23. Neoprene stoppers 36 are provided for the ends of gel tubes 29 which are not filled with a sample.

The lower disc 23 has a conical bore 37 for receiving the hollow central core 31 of the gel tube holder 16. A plurality of holes 38 having their top edges at the point of contact of conical bore 37 and hollow central core 21 are placed around the entire circumference of central core 21. Holes 38 may best be seen in FIG. 4 and are utilized for allowing gas to escape from lower buffer chamber 18 when filled with a buffer solution.

An extracting and sealing means is shown generally at 39 in FIG. 3. Extracting and sealing means 39 has an extractor sealing disc 41 disposed in the lower buffer chamber 18. Mounted on extractor sealing disc 41 in juxtaposition with the lower ends of gel tubes 29 is a sealing gasket 42. Extractor sealing disc 41 has a central threaded hole 43. A rod 44 extends vertically through the center of hollow central core 21 having external threads on its upper and lower ends. The threads on the lower end of rod 44 are for engagement with the central threaded hole 43 and extractor sealing disc 41. A hexagonal nylon nut 46 has internal threads for engagement with the threads on the upper end of rod 44. A plastic washer 47 is formed to fit the top of hollow central core 21 surrounding rod 44. Hexagonal nylon nut 46 bears against the plastic washer 47 when cover 12 is not present, and against cover 12 when it is installed.

Referring to FIG. 5 a pair of electrical terminals 48 are shown on a vertical extension 49 of hollow central core 21. An external groove 51 and an internal groove 52 are formed on hollow central core 21 extending in a direction parallel to the axis of core 21. An external circumferential groove 53 intersects groove 51 in the upper buffer chamber 17. A hole 54 extends through the wall of hollow central core 21 below lower disc 23 in lower buffer chamber 18. A second external circumferential groove 56 intersects hole 54 in lower buffer chamber 18. An electrical conductor extends from one of the electrical terminals 48 through the grooves 51 and 53 to form an electrode for the upper buffer chamber 17. A separate electrical conductor extends from the other of the electrical terminals 48 through the groove 52, the hole 54 and the groove 56 to afford an electrode for the lower buffer chamber 18. The routing of the conductors in grooves 51 and 53 and in groove 52, hole 54 and groove 56 is set out in detail in FIGS. 5, 6, 6a, and 7.

Turning now to the operation of the gel electrophoresis unit, reference is made to FIG. 1 which shows the major subassemblies of the apparatus. The transparent container 11 receives the extracting sealing means 39 prior to insertion of the gel tube holder 16 carrying the gel tubes 29. Inlet and outlet means 13 and 14 respectively provide external access to the cooling chamber 19 and washer 47 is installed without cover 12 for photopolymerization, and cover 12 is installed for electrophoresis.

In carrying out the process for which the electrophoresis unit is designed, the gel tube holder 16 is removed from the container 11. Grommets 31 are firmly pressed in the holes 32 in the upper and lower discs 22 and 23. The empty gel tubes 29 are moistened and pushed through the upper grommets 31 until they just exit from the lower grommets 31 in disc 23. Gel tube holder 16 is placed over the extracting and sealing means 39 with the rod 44 centrally located in hollow central core 21. Washer 47 is placed over the upper end of rod 44 and seated into the top rim of the central core 21. Nylon nut 46 is threaded onto the threads at the top end of rod 44 until it bears against the washer 47 and draws the extractor and sealing disc 41 upward toward the bottom of lower disc 23 until sealing gasket 42 is firmly pressed against the bottom opening in gel tubes 29. Pressure is applied to the top of each of the gel tubes 29 to provide positive contact between the sealing gasket 42 and the bottom of the gel tubes 29. When fewer than the total number of gel tubes 29 are to be used, one of the stoppers 36 is placed into the top of each gel tube 29 which will not be used. The soluble colloid, using a solvent such as acrylomide, is poured into each of the gel tubes 29 designated to carry a sample.

Each of the O-rings 34 may be moistened and the combination gel tube holder 16 and extractor sealing means 39 is gently lowered into the tapered inside diameter of container 11. When the base of electrical terminals 48 is substantially level with the rim of container 11, the seals provided by O-rings 34 to separate container 11 into an upper and lower buffer chamber 17 and 18 respectively and a cooling chamber 19 are sufficient to isolate the chambers. Tubing (not shown) is connected to the tapered fittings on the end of inlet means 13 and outlet means 14 and the inlet means 13 is connected to a water supply. Outlet means 14 is directed to a waste sink (not shown). It should be noted that a maximum of one to one and a half liters of coolant per minute should be circulated. Greater flow rates than this create high pressures which may destroy the isolation between the chambers by producing slight leaks around the O-rings 34.

At this stage the entire assembly contained in container 11 is subjected to polymerizing light and the solutions in gel tubes 29 are polymerized. When polymerization is completed nylon nut 36 is loosened carefully so that the bottom of the gels in tubes 29 are not disturbed. Nut 46 and washer 47 are removed and the extractor sealing disc 41 is allowed to rest on the bottom of container 11. If any water from the cooling chamber 19 has leaked into the lower buffer chamber 18 the entire unit may be carefully inverted so that it may be poured out through the center of hollow central core 21. Water leakage may indicate that the gel tube holder 16 was not pushed far enough into container 11 to effect the seal at the O-rings 34, or that the coolant flow rate through cooling chamber 19 was too high.

The lower buffer chamber 18 may now be filled with buffer solution through the center of hollow central core 21. Tilting the entire unit from side to side will ensure that air bubbles trapped under the gel tubes are allowed to exit through conical bore 37, holes 38, and the center of hollow central core 21. Lower buffer chamber 18 should be filled until the buffer solution level reaches a level inside hollow central core 21 well above upper disc 22. The samples are placed in the gel tubes 29 to rest atop the polymerized solutions contained therein. Upper buffer chamber 17 should then be filled to a level substantially the same as the buffer solution level inside hollow central core 21.

Place the lid 12 over the open end of container 11. The electrophoresis unit should never be operated without lid 12 in place as it prevents accidental electrical shock to the operator and also allows the extractor to function properly as hereinafter described. Attach the coolant tubing to the inlet and outlet means 13 and 14 respectively as above. Attach the high voltage cables (not shown) to the input terminals 48 and proceed with electrophoresis.

Upon completion of electrophoresis the high voltage cables are disconnected from the electrical terminals 48. The coolant lines are disconnected from the inlet and outlet fittings 13 and 14 respectively. Lid 12 may be removed and coolant chamber 19 and upper and lower buffer chambers 17 and 18 may be emptied by inverting the entire unit. After replacing lid 12, thread the nylon nut 46 onto the threads at the upper end of rod 44 raising the extractor sealing disc 41 into contact with the lower surface of the gel tube holder 16. Continue turning nut 46 until the seal between O-ring 34 and the tapered inside diameter of container 11 is broken. Grasping the nut 46, the gel tube holder 16 and extracting sealing means 39 may be withdrawn from the container 11 as a unit.

A gel electrophoresis apparatus and method is provided which allows gel tube sealing polymerization, unsealing, and electrophoresis all within the apparatus. Faulty tests due to improper sample temperature control or unequal hydrostatic pressures on the sample columns is eliminated. A safety feature protecting the operator from electrical shock during electrophoresis and a built-in extractor for the gel tube holder are provided.

I claim:

1. A gel electrophoresis apparatus comprising a container having an open end, a gel tube holder removably fitted in said container, sealing means cooperating between said container and said gel tube holder to define an upper and lower buffer chamber within said container and a cooling chamber disposed therebetween, means in communication with said cooling chamber for providing an inlet and an outlet path therefore, a plurality of gel tubes extending through said cooling chamber having internal bores communicating with said first and second buffer chambers, and means mounted within said container for providing an electrical potential between said upper and lower buffer chambers.

2. A gel electrophoresis apparatus as in claim 1 together with means disposed in said lower buffer chamber for extracting said gel tube holder from said container and for simultaneously sealing one end of said plurality of gel tubes.

3. A gel electrophoresis apparatus as in claim 1 together with means cooperating with said container and said gel tube holder for both extracting said gel tube holder from said container and for sealing one end of said plurality of gel tubes, and wherein said means for extracting and sealing, said means for providing an electrical potential between said upper end lower buffer chambers, and said means for providing inlet and outlet paths are all accessible externally of said container.

4. A gel electrophoresis apparatus as in claim 1 wherein said container comprises a jar for passing polymerizing light from a point external of said jar through said cooling chamber to said plurality of gel tubes.

5. A gel electrophoresis apparatus as in claim 1 wherein said container has a tapered internal diameter diminishing proceeding away from said open end, and wherein said gel tube holder comprises first and second circular discs having an equal number of overlying holes therethrough, a sealing grommet in each of said holes for receiving said gel tubes, a central core for supporting said first and second discs in spaced relation for forming said cooling chamber therebetween, said first disc having a pair of additional holes for receiving said inlet and outlet means.

6. A gel electrophoresis apparatus as in claim 5 wherein said central core extends from said lower buffer chamber through said upper buffer chamber having an inside diameter in communication with said lower buffer chamber, whereby a buffer solution may be placed in said lower chamber until it rises in said core and said upper and lower buffer chambers are filled to substantially the same levels eliminating the risk of distorting low concentration gels.

7. A gel electrophoresis apparatus as in claim 5 wherein said first and second discs have O-ring grooves around the circumference, and wherein said sealing means comprises O-rings seated in said O-ring grooves, and wherein said central core has a bore extending therethrough for communication with said lower buffer chamber, whereby each of said upper and lower buffer chambers may be filled through the open end of said container.

8. A gel electrophoresis apparatus as in claim 5 wherein said means for providing an electrical potential between said upper and lower buffer chambers comprises first and second terminals mounted on said central core, first and second conductors attached to said first and second terminals respectively extending adjacent said central core in communication with said upper and lower buffer chambers respectively, whereby an electrical potential applied at said first and second terminals is applied between said upper and lower buffer chambers.

9. A gel electrophoresis apparatus as in claim 1 wherein said gel tube holder comprises a hollow central core, first and second discs spaced on said hollow central core having a plurality of overlying holes for sealably receiving said plurality of gel tubes and for mounting said sealing means, and wherein said means for extracting said gel tube holder and for sealing one end of said plurality of gel tubes comprises a sealing disc disposed in said second buffer chamber, a sealing gasket attached to said sealing disc in juxtaposition with said plurality of gel tubes, a rod extending through said hollow core for engaging said sealing disc, a washer formed to fit over said hollow core surrounding said rod, a cover formed to fit the open end of said container, and means for urging said rod axially out of said hollow core for bearing against said washer and said cover, whereby when said means for urging said rod bears against said washer said gasket seals one end of said plurality of gel tubes, and when said means for urging said rod out of said hollow core bears against said cover said disc extracts said gel tube holder.

10. A gel electrophoresis apparatus as in claim 1 wherein said plurality of gel tubes are fire polished glass tubes.

11. In a gel electrophoresis apparatus a container for passing polymerizing light having an open end and a tapered internal diameter diminishing away from said open end, a gel tube holder removably fitted in said container, said gel tube holder cooperating with said container internal diameter to form upper and lower buffer chambers and a cooling chamber therebetween, means for sealing between said upper and lower buffer chamber and said cooling chamber, a plurality of gel tubes extending through said cooling chamber in communication with said upper and lower buffer chambers, means cooperating with said container and said gel tube holder for extracting said gel tube holder from said container, means for sealing simultaneously one end of each of said plurality of gel tubes, inlet and outlet means for providing flow of a cooling medium through said cooling chamber, and means for providing an electrical potential between said upper and lower buffer chambers, whereby soluble colloids may in sequence be placed in said plurality of gel tubes, contained therein, polymerized, and exposed at opposite ends of said gel tubes to said upper and lower buffer chambers.

12. A gel electrophoresis apparatus as in claim 11 wherein said gel tube holder has a hollow central vertical core, and wherein said means for extracting said gel tube holder comprises an extractor disc disposed in said lower buffer chamber, a rod extending through said hollow core in said gel tube holder, a cover formed to fit the open end of said container having a central opening surrounding said rod, and means for engaging said rod and bearing against said cover, said last named means operating to lift said rod and to bring said extractor disc into engagement with the bottom of said gel tube holder for breaking the seal between said holder and said internal tapered bore of said container.

13. A gel electrophoresis apparatus as in claim 12 wherein said means for providing an electrical potential comprises a pair of electrical terminals and conductors connected independently to said terminals extending one each into said upper and lower buffer chambers, and wherein said cover has openings provided for said terminals to extend therethrough, whereby when said cover is installed and an electrical potential is applied between said terminals no part of the electrical circuit is exposed externally of the apparatus.

14. A gel electrophoresis apparatus as in claim 11 wherein said means for sealing simultaneously one end of said plurality of gel tubes comprises a sealing disc, a sealing gasket on said sealing disc in juxtaposition with the ends of said plurality of gel tubes which are in communication with said lower buffer chamber, and wherein said gel tube holder has a hollow central vertical core, a rod extending through said hollow core of said gel tube holder for engaging said sealing disc, a washer formed to fit the upper end of said hollow core surrounding said rod, and means for engaging said rod and for bearing against said washer, whereby when said last named means bears against said washer said sealed gasket is brought into simultaneous contact with the ends of said plurality of gel tubes for holding fluids for polymerization.

15. A gel electrophoresis apparatus as in claim 11 wherein said gel tube holder has a hollow central vertical core, wherein said upper buffer chamber may be filled with a buffer solution to a specified level, and wherein said lower buffer chamber may be filled with a buffer solution to substantially the same level in said gel tube holder hollow core, whereby the hydrostatic head on the gel contained in the plurality of gel tubes is equalized on the ends thereof for elimination of the risk of distorting low concentration gels.

16. The method of performing gel electrophoresis which comprises the steps of placing empty gel tubes in a gel tube holder, sealing the lower ends of the gel tubes, pouring a soluble colloid into the gel tubes, maintaining the gel tubes at a constant temperature, polymerizing the soluble colloid in the gel tubes, unsealing the lower end of the gel tubes, communicating the lower end of the gel tubes with a buffer solution, placing a sample in the upper ends of the gel tubes, communicating the upper end of the gel tubes with a buffer solution, equalizing the hydrostatic head of the buffer solutions, removing all trapped bubbles in the buffer solutions, and applying an electrical potential between the buffer solutions.

* * * * *

UNITED STATES PATENT OFFICE
CERTIFICATE OF CORRECTION

PATENT NO. : 3,867,271
DATED : February 18, 1975
INVENTOR(S) : STANTON A. HOEFER It is certified that error appears in the above-identified patent and that said Letters Patent are hereby corrected as shown below:

Column 5 of the patent, Claim 1, lines 52 and 53, the words "first and second buffer chambers" should read "upper and lower buffer chambers" as recited in column 5, Claim 1, line 47.

Signed and Sealed this twenty-third Day of December 1975

[SEAL]

Attest:

RUTH C. MASON
Attesting Officer

C. MARSHALL DANN
Commissioner of Patents and Trademarks